United States Patent [19]

Uehara et al.

[11] Patent Number: 4,583,033
[45] Date of Patent: Apr. 15, 1986

[54] SPEED CONTROL DEVICE FOR STEPPING MOTOR

[75] Inventors: Tadayoshi Uehara; Yasuhiko Oyamada, both of Sagamihara, Japan

[73] Assignee: Aida Engineering, Ltd., Sagamihara, Japan

[21] Appl. No.: 575,060

[22] Filed: Jan. 30, 1984

[30] Foreign Application Priority Data

Feb. 23, 1983 [JP] Japan ............................ 58-29008
Nov. 2, 1983 [JP] Japan ............................ 58-206381
Nov. 12, 1983 [JP] Japan ............................ 58-212798

[51] Int. Cl.⁴ .......................................... H02P 8/00
[52] U.S. Cl. ................................. 318/696; 318/685
[58] Field of Search .......................... 318/696, 685

[56] References Cited

U.S. PATENT DOCUMENTS 3,601,678 8/1971 Abraham ............................ 318/685

Primary Examiner—William M. Shoop, Jr.
Assistant Examiner—Saul M. Bergmann
Attorney, Agent, or Firm—Holman & Stern

[57] ABSTRACT

A speed control device for stepping motor is disclosed which is possible to freely control the running speed of the stepping motor when driving it in closed loop. Its mechanism is designed to be possible to decide which excitation phase to be excited according to a phase difference between the output signals emitted from the encoder and the speed-variable reference clock signals and to make the running speed of stepping motor follow to the instruction of said reference clock signals.

3 Claims, 11 Drawing Figures

A
B
C

C

C

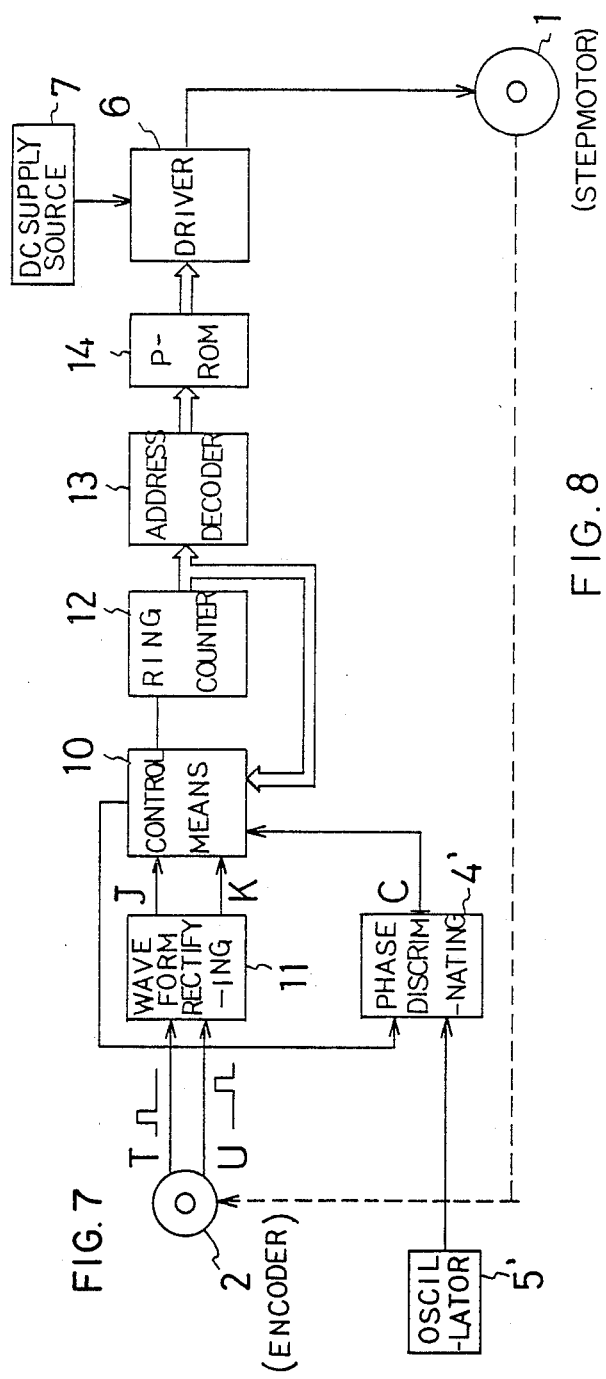
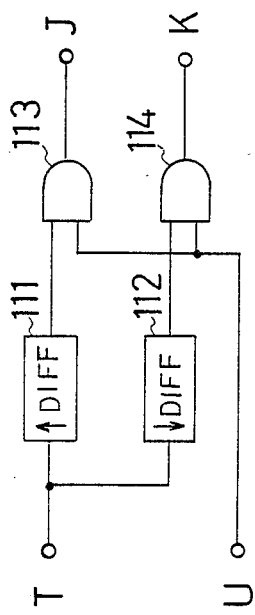
FIG. 7
FIG. 8

SPEED CONTROL DEVICE FOR STEPPING MOTOR

TECHNICAL FIELD OF THE INVENTION

The present invention relates to a speed control device for stepping motor, and more particularly to a speed control system for stepping motor to make it possible to freely control the speed thereof when actuating said stepping motor in a so-called closed loop.

TECHNICAL BACKGROUND AND ITS CONTROVERSIAL POINT OF THE INVENTION

As is commonly known, the stepping motor is generally employed in open loop because it has two specific characters that (1) its running speed is proportional to a generating speed of the pulses and (2) its revolutionary frequency is proportioned to a generating number of the pulses. However, if the stepping motor is used in open loop, there may be some cases where it runs into unforeseen disorder due to a fluctuation of the load falling on the motor. For this reason, when a stability of the performance is specifically requested, a closed loop control system is generally used which is possible to change an excitation mode on the basis of informations showing a current phase of the stepping motor which are obtained by feeding encoder output signals back to a pulse distributor.

Where using the stepping motor in the closed loop in this way, the aforementioned disorder due to said load fluctuation can positively be prevented, however, it is impossible to give instructions of intermediate speed and in consequence to set freely the speed of stepping motor because such a speed control method is to be realized by changing over an excitation mode prepared in advance.

OBJECTS AND BRIEF SUMMARY OF THE INVENTION

It is, therefore, outstanding objects of the present invention to eliminate such drawbacks of prior art and to provide a new and unique speed control device for stepping motor which enables controlling freely the running speed of the stepping motor, especially used in the closed loop.

That is to say, the speed control device for stepping motor under the present invention is to realize the above-noted objects through a unique contrivance in which comprises a means electrically generating an excitation pattern given to the stepping motor, a means renovating said excitation pattern, a means comparing a current speed of the stepping motor with an instruction speed given thereto, a means changing a renovation speed of said excitation pattern according to a difference between the current speed and the instructed speed of the stepping motor and a means making said current speed follow to the said instructed speed.

BRIEF DESCRIPTION OF THE DRAWINGS

The present invention will more fully be understood, together with further advantages thereof, by reference to the following specification taken in connection with the accompanying drawings, in which;

FIG. 7 is a block diagram showing a yet another embodiment of the present invention, FIG. 8 is a circuit diagram showing a composition example of wave form rectifying means.

DETAILED DESCRIPTION OF THE INVENTION

The present invention will now be described in further detail as for the specific embodiment in connection with the accompanying drawings.

Figure 1:
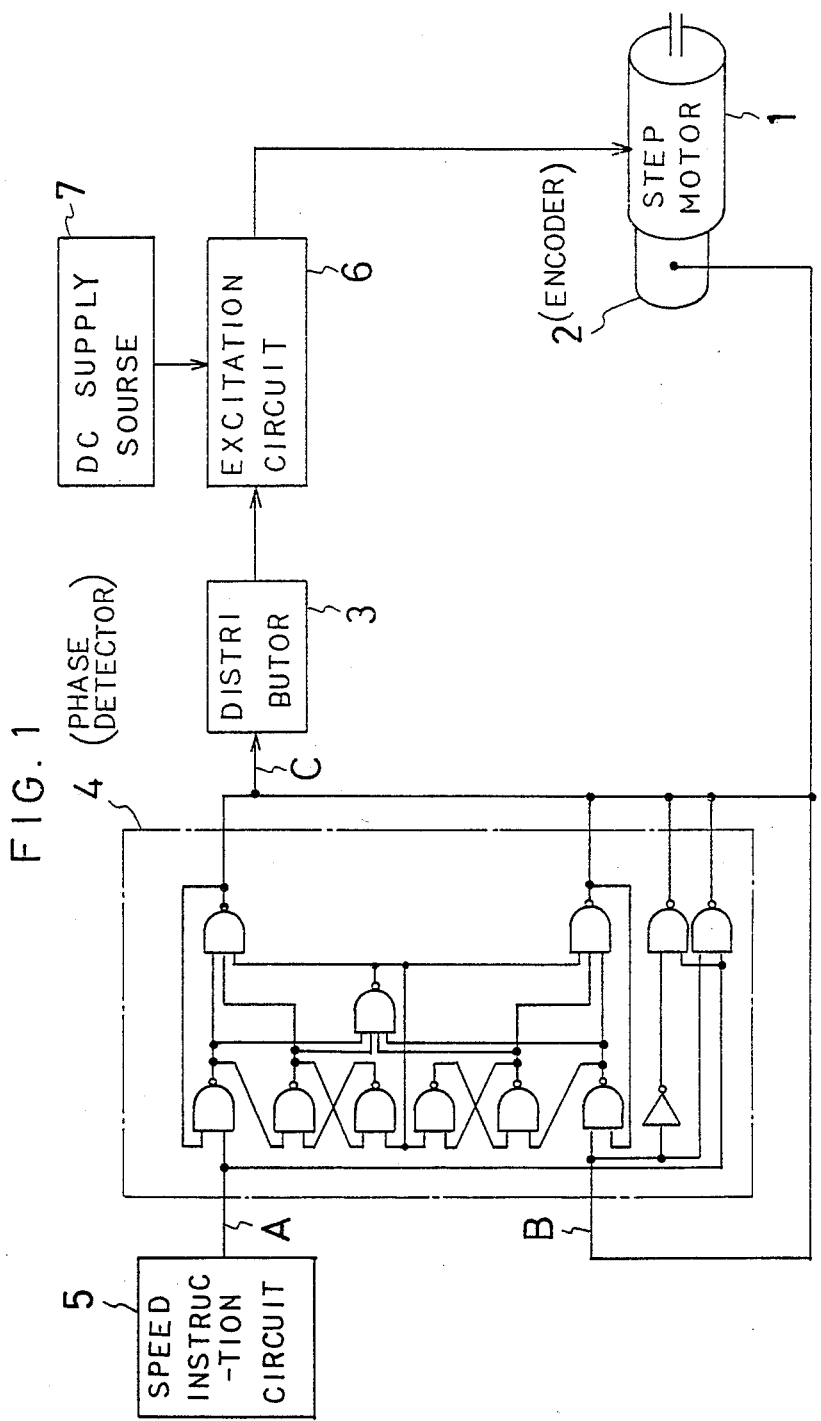
FIG. 1 is a block diagram showing an embodiment of the present invention.

Initially let us begin an explanation from the embodiment shown in FIG. 1. The numeric number "1" shows a stepping motor and "2" shows a encoder connected thereto. This encoder 2 is the sel-same in the structure as that of the ordinary type and designed to put out the pulse signals correspondent to a rotational position and an excitation phase of the rotor. These pulse signals are put into a distributor 3 and also a phase detector 4. To another input port of this phase detector 4, the pulse signals emitted from a speed instruction circuit 5 are given. The speed instruction circuit 5 comprises of a pulse generator which is possible to optionally change its frequency manually. And the phase detector 4 comprises of a circuit illustrated in FIG. 1 and an output pulse wave form "C" of this phase detector 4 corresponding to each input pulse wave form "A" and "B" is as given in FIG. 2. The distributor 3 is designed to receive both of the output pulses "C" and the output pulses emitted from encoder 2, and to excite an excitation phase next to the excitation phase corresponding to the output pulses of the encoder 2 when the output pulses of phase detector 4 are at H-level and also to excite an excitation phase corresponding to the output pulses of encoder 2 when it is at L-level.

It is needless to say that each excitation phase is not excited *directly* by the output power coming from the distributor 3 but excited *indirectly* through an excitation circuit 6 from a DC supply source 7 in the same way as former method.

Figure 2:
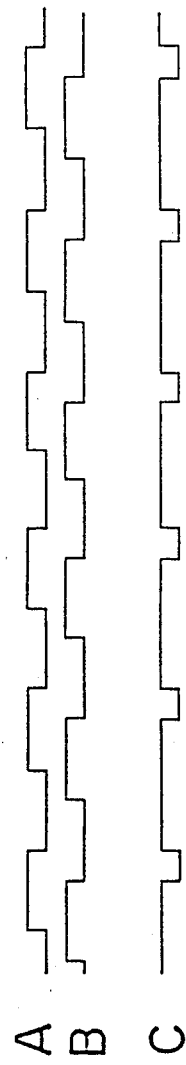
FIG. 2 is a timing chart of working example of the phase detector.

As noted above, when the excitation phase of stepping motor 1 is excited according to a phase difference between pulses coming from both of the encoder 2 and the speed instruction circuit 5, if the running speed of stepping motor 1 is slow and the wave width of output pulses is large, the wave width of L-level side in the output of phase detector 4 becomes smaller, while that of H-level side becomes larger, as shown in FIG. 2. Also, when the output pulses of phase detector 4 are at H-level, an excitation phase next to the current rotational position of the rotor (un-illustrated) will be excited and in consequence a revolution of the rotor will be accelerated but, if the output pulses of phase detector 4 are at L-level, the excitation phase corresponding to the current rotational position of the rotor will be re-excited and causes the rotor revolution to decelerate. Therefore, if the wave width of H-level side in the output pulses "C" becomes larger, the rotor becomes gradually fast (ACCELERATION), and on the contrary if that of L-level side in the output pulses "C" becomes larger it becomes slow (DECELERATION). Thus, the pulses "A" emitted from the speed instruction circuit 5 comes to a coincidence in a fixed relationship with the pulses "B" emitted from the encoder 2.

In this way, this device according to the present invention is designed to enable making the motor revolution follow up to the pulses emitted from the speed instruction circuit 5. Consequently, depending on the present invention, the running speed of stepping motor 1 can optionally be controlled by changing a frequency of the output pulses emitted from the speed instruction circuit.

Figure 3:
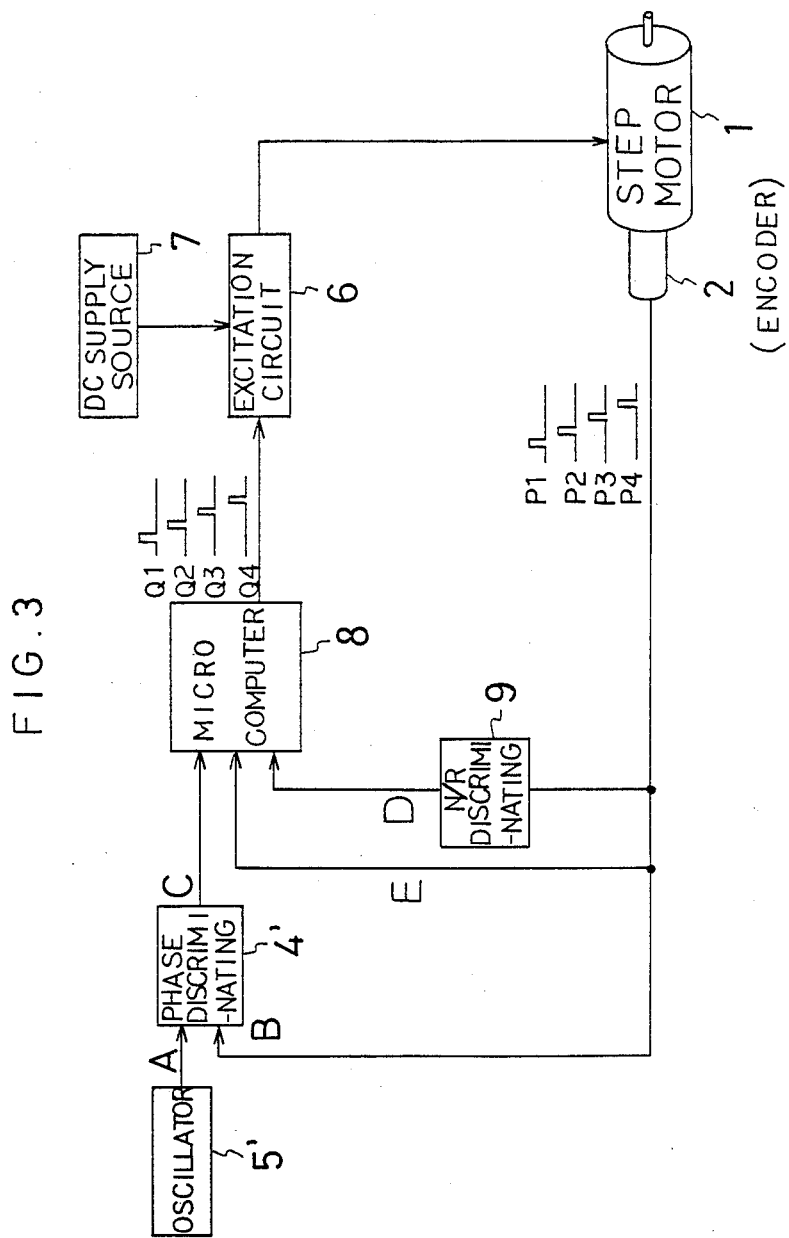
FIG. 3 is a block diagram showing another embodiment of the present invention.

Referring next to FIG. 3, a block diagram showing another embodiment of the present invention is illustrated therein. The stepping motor 1 has generally several excitation phases, e.g. four (4) phases and runs when the excitation signals of Q1, Q2, Q3 and Q4 are sequentially given to each of the said four excitation phases. The encoder 2 is connected to this stepping motor 1. Although the type of encoder 2 is not specifically confined, if an absolute encoder, for instance, is employed for this purpose, it will be possible to be made to put out the positional signals of P1, P2, P3 and P4 according to the current rotational position of the rotor. The device according to the present invention is designed to detect various conditions of the stepping motor by using both of the output signals emitted from the encoder 2 and their processed signals and to determine the excitation order of each excitation phase of the stepping motor 1 by the aid of a microcomputer 8 in accordance with the different conditions of the stepping motor 1.

Figure 6:
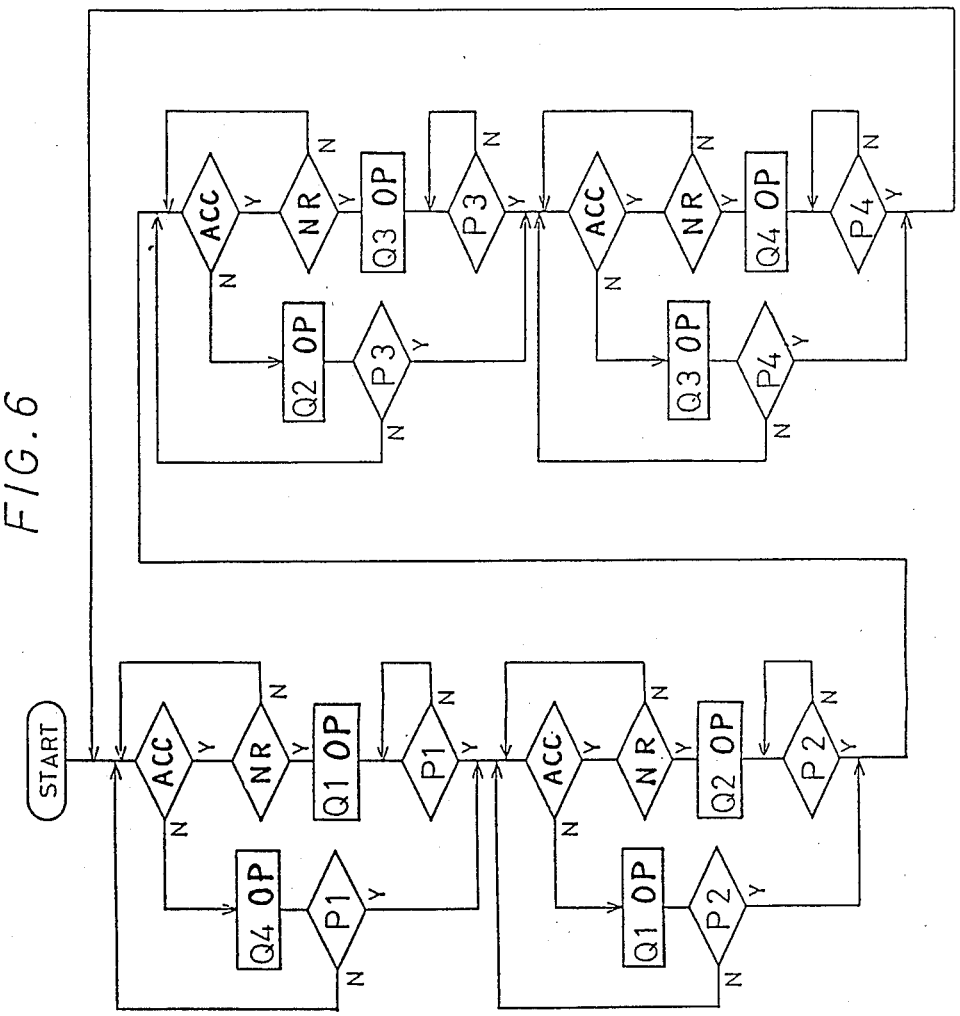
FIG. 6 is a flow chart of control operation in the embodiment shown in FIG. 3.

The control operations of this microcomputer 8 are as shown in a flow chart of FIG. 6. In order to practice such control operations, a variety of pulse signals to be noted in the following papers are put into this microcomputer 8.

The most cardinal pulse signals among them are output signals "C" emitted from the phase discriminating means 4', by which the microcomputer 8 determines whether an accelerating order have to be given or decelerating order have to be given to the stepping motor 1. That is to say, the reference clock signals "A" emitted from a frequency-variable oscillator 5' are impressed to one of the input ports of the phase discriminating means 4' and at the same time the speed signals "B" directing the rotor's running speed are impressed to another input port thereof from the encoder 2. The phase discriminating means 4' makes a comparison between phases of both signals, and functions to rise the output signals "C" when the phase of reference clock signals "A" is forward in position and to fall the output signals "C" when it is backward in position. Thus, the microcomputer 8 judges a logical level of the output signals "C" emitted from phase discriminating means 4' and, when it is in "LOGIC 1" (i.e. when the running speed of rotor is slower than the instruction speed of reference clock signals "A"), the microcomputer judges "it is necessary to issue an acceleration order" and designates an excitation phase relevant to the acceleration to quicken the running speed of the stepping motor 1. On the contrary, when the output signals "C" of phase discriminating means 4' are in "LOGIC 0", the microcomputer judges "it is necessary to issue a deceleration order" and designates an excitation phase relevant to the deceleration to slow down the running speed of the stepping motor 1. In this way, the running speed of stepping motor 1 comes to follow up always to the reference clock signals "A".

Incidentally we may remark that, for speed signals "B" to be put into the phase discriminating means 4', there is no objection to the use of any type of signals if they are of such types as can detect the running speed of the rotor, and it may consequently be permissible to also use any one of the positional signals P1, P2, P3, P4 emitted from the encoder 2 as they are, or also to use every one of said positional signals in order to enhance further accuracy. For an actual example of phase discriminating means 4', one may refer to the phase detector employed in the Motorola MTTL MC4044 PLL circuit (Phase Locked Loop circuit) for providing self-synchronization of digital apparatus.

Further, the output signals of a normal/reverse rotations discriminating means 9 are also put into the microcomputer 8, which detects whether or not any vibration is generated in the rotor portion through the output signals "D" of said normal/reverse rotations discriminating means 9. Although the stepping motor 1 runs by sequentially impressing the excitation signals Q1, Q2, Q3 and Q4 to each excitation phase thereof, its running motion is apt to involve certain of vibrations (i.e. repetition of normal/reverse rotations in a period of the minutest hour) especially in a low speed zone because its running motion, microscopically, is made step by step. If the stepping motion of excitation phase takes place while a relatively large vibration is being generated and its vibrating direction is contrary to the normal direction, it is feared that the stepping motor runs into disorder. Therefore, in this embodiment, the speed control device is so contrived that the microcomputer always monitors the output signals "D" of normal/reverse rotations discriminating means 9 and makes the excitation phase step forward while the rotor is running to the normal direction.

By the way, the normal/reverse rotations discriminating means, in actual cases, may easily be made up through a status flag showing that said discriminating means 9 is set when the positional signals P1, P2, P3 and P4 are put therein in normal sequence and said discriminating means 9 is reset when said positional signals are put therein in reverse sequence.

The positional signals P1, P2, P3 and P4 emitted from the encoder 2 are put into the input ports, relevant to each of said positional signals, of the microcomputer 8, which decodes these signals and senses the present phase of rotor. As has been understood from the aforementioned descriptions, the device used in this embodiment is designed to decelerate the running speed of rotor timely while standing by an issue of excitation signals Q1, Q2, Q3 and Q4 according to the deceleration order given from the phase discriminating means 4 when the running speed of rotor becomes faster than the value directed by the reference clock signals, but the rotor may keep on running for some time due to an inertia force. At this time, if the next excitation signals Q1, Q2, Q3 and Q4 are given to the excitation phase before the rotor runs to a fixed phase by this inertia force, there is a possibility that the stepping motor falls into disorder. Therefore, the control device according to the present invention is so contrived that the microcomputer gives an order to generate the next excitation signals Q1, Q2, Q3 and Q4 after sensing the current phase of rotor through the positional signals P1, P2, P3, P4 and ascertaining that the rotor ran to a fixed phase.

In passing, we may add that an excitation circuit 6 to drive the stepping motor 1 by amplifying the excitation signals Q1, Q2, Q3 and Q4 emitted from the microcomputer 8 and a DC power source 7 for supplying the power to this excitation circuit are the same construction as conventional ones.

Since the structural aspects of the speed control device for stepping motor under the present invention have mainly been described in the above, let us next enter into an explanation of the working principle by reference to the aforementioned structural characters and the accompanying drawings.

Figure 4:
FIGS. 4 and 5 are timing charts of output pulses emitted from phase discriminating means.

When the operator starts the stepping motor or quickens an emission of reference pulse signals from the oscillator 5, the phase of said reference pulse signals will move forward than that of output pulses emitted from the encoder 2. Accordingly, a continuous time of the output signals "C" emitted from phase discriminating means 4' at an initial stage will extremely be prolonged at the time of "Logic 1", while it will exceedingly be shortened at the time of "Logic 0", as shown in the timing chart of FIG. 4.

The microcomputer 8 discriminates the difference between said logic levels of the output pulses "C" emitted from the phase discriminating means 4' and judges its state as "it is proper to give an acceleration order" if said level is in "Logic 1" and issues the excitation signals Q1, Q2, Q3 and Q4 to make the excitation phase step forward, thus providing the accelerating motion for the stepping motor 1.

Accordingly, the continuous time of output pulses "C" emitted from the phase discriminating means 4' will then gradually be shortened in "Logic 1", and in "Logic 0" it will gradually be prolonged. Thus, the two will soon come to equilibrium state where the speed of stepping motor 1 be stabilized.

By the way, when the excitation signals now emitted from the microcomputer are of $Q_i$ ("i" is a natural number of 1 through 4), the acceleration control to be practiced by the microcomputer 8 is to put out the excitation signals of $(Q_i+1)$. However, when the rotor is in reverse rotation, if the excitation signals Q1, Q2, Q3, Q4 are sequentially given to make the excitation phase step forward, there is a possibility that the stepping motor falls into disorder, especially in low speed zone due to the vibrations as has been aforementioned. Therefore, the device under the present invention is so contrived that the excitation signals Q1, Q2, Q3 and Q4 are sequentially given to cause the excitation phase to step forward after making sure that the rotor is in normal rotation by turning said vibration back to a stationary state while monitoring the output pulses "D" of a normal/reverse rotations discriminating means 9 and then the next excitation signals are put out to excite the next excitation phase after making sure that the present phase is in $Q_i$ according to the positional signals P1, P2, P3 and P4 emitted from the encoder 2.

Figure 5:

On the other hand, when the operator makes an issue of the reference pulse signals emitted from the oscillator 5' so as to decelerate the running speed of stepping motor, the output phase of the encoder 2 will move forward in position than the phase of reference pulse signals. Consequently, the continuous time of output signals "C" emitted from the phase discriminating means 4' at an initial state will extremely be shortened at the time of "Logic 1", while at the time of "Logic 0" said continuous time of output signals "C" will exceedingly be prolonged, as shown in the timing chart of FIG. 5.

The microcomputer 8 discriminates said difference between both logic levels of the output pulses "C" emitted from the phase discriminating means 4', as shown obviously in FIG. 6, and judges its state as "it is proper to give a deceleration order" if said level is in "Logic 0" and ceases the sequential emission of excitation signals Q1, Q2, Q3 and Q4, and issues the excitation signals of $Q_i$ as they are if the excitation signals now emitted from the microcomputer are of $Q_i$. The stepping motor 1 will therefore result in the braked condition and its running speed will gradually go to reduction.

Accordingly, the continuous time of output signals "C" emitted from phase discriminating means 4' will gradually be prolonged at the time of "Logic 1", while it will be shortened at the time of "Logic 0". And both logic levels will soon come to a balance condition, where the running speed of stepping motor is stabilized.

Thus, if the sequential emission of the excitation signals Q1, Q2, Q3 and Q4 are interrupted, the stepping motor will surely be led to deceleration but, the rotor will keep further on running for a little while due to its inertia force, as aforementioned. For this reason, the device employed in this embodiment is designed to monitor the positional signals P1, P2, P3 and P4 emitted from the encoder 2 and to enter into the next control step after making sure, through the microcomputer 8, that the rotor ran to the next phase due to said inertia force. Therefore, more smooth running of the stepping motor is ensured through this contrivance.

Referring then to FIG. 7, a block diagram of the speed control mechanism relating to another embodiment of the present invention is illustrated therein. In this FIG. 7, the numeric number "1" shows a stepping motor, which is driven by the sequential renovations of the excitation pattern.

The encoder 2 is connected to the revolutionary shaft of this stepping motor 1, and the encoder 2 generates output pulses synchronized with the revolution of the stepping motor 1. Although the kind of encoder 2 is specifically not confined, it is advisable, for instance, to use an incremental encoder which generates output pulses having a phase difference of A and B. In this incremental encoder, a pulse generating number shows an actual revolution frequency of the stepping motor 1, a pulse generating speed shows an actually running speed of the same and a pulse generating sequence shows an actually running direction of the same.

The output signals of this encoder 2 are put into one of the input ports of the phase discriminating means 4', which compares said signals with the reference clock signals and detects whether the running speed of stepping motor 1 is faster or slower than the instruction speed. That is to say, the reference clock signals "A" emitted from the oscillator 5', which generates speed-variable reference clock signals, are put into another input port of the phase discriminating means 4', which derives "Logic 1" to its output terminal when the phase of said reference clock signals "A" moves forward in position than the phase "T" of the output pulses emitted from the encoder 2, and when it moves backward in position, derives "Logic 0" to its output terminal. The output pulses "C" of this phase discriminating means 4' are then put into a control means 10, which functions to do an acceleration control of stepping motor 1 when the output signals of the phase discriminating means 4' are in "Logic 1" and a deceleration control of the stepping motor 1 when said signals are in "Logic 0". Incidentally, we may add that an actual composition of the phase discriminating means 4' may be made as aforementioned.

Figure 9:
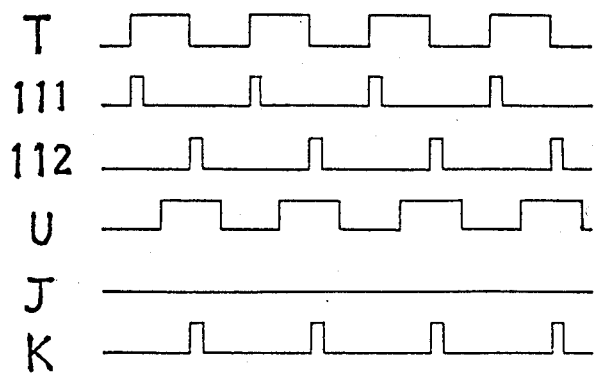
FIGS. 9 and 10 are timing charts showing respectively working examples of wave form rectifying means.
Figure 10:
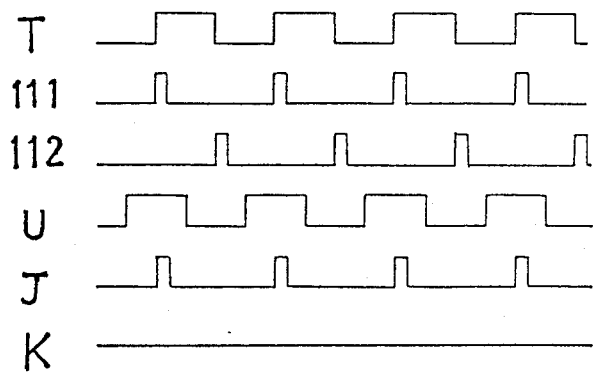

A wave form rectifying means 11 is to rectify the output pulses having two phases of A and B emitted from the encoder 2 and to derive the signals showing whether the stepping motor 1 runs to normal or reverse direction. FIG. 8 shows an actual circuit example of the wave form rectifying means 11, which causes differentiating circuits 111 and 112 to generate the respective pulses by timing an appearance of the pulses at a leading edge and a trailing edge of the A-phase pulses, and the pulses thus generated by the differentiating circuit are fed to the "AND" gates 113 and 114. When said pulses pass through said AND gates, they are gated by B-phase pulse signals. As can be understood from FIG. 9, when the stepping motor 1 is in reverse run, the phase of A-phase output signals moves forward 90 degrees than that of B-phase output signals. Consequently, the output pulses of said differentiating circuit 112 which are obtained by differentiating the trailing edge of A-phase signals are put out of the AND gate 114. On the contrary, as shown in FIG. 10, when the stepping motor 1 is in normal run, the phase of B-phase output signals moves forward 90 degrees than that of A-phase output signals. Accordingly the output pulses of said differentiating circuit 111 which are obtained by differentiating the leading edge of A-phase output signals are put out of the AND gate 113. Said two pulse signals are thus, emitted from these AND gates 113 and 114; one is a normal rotation detecting signals "J" and another is a reverse rotation detecting signals "K", which are respectively put into the aforementioned control means 10.

For more detailed composition and function of said control means 10, refer to the descriptions which will further in detail be noted later.

The control means 10, in short, is to give "count-up clock signals" to a ring counter 12 according to a certain logic condition. The ring counter 12 counts the count-up clock signals and feeds the thus counted value to an address decoder 13, which decodes the said counted value fed from the ring counter 12 and accesses the required informations sequentially from P-ROM 14. Accordingly, it is advisable to store in advance the table of excitation pattern required to drive the stepping motor 1 in this P-ROM and also to make the count value receivable from the ring counter 12 correspond to the address of P-ROM. If so, the excitation phase of the stepping motor 1 will sequentially be renovated whenever the control means 10 puts out the count-up clock signals. Accordingly, the more the number of said count-up clock signals emitted from said control means 10 increases, the more the renovation speed of excitation pattern increases, so that the stepping motor will go to acceleration. On the contrary, the less the number of said clock signals reduces, the less the renovation speed of excitation pattern decreases, so that the stepping motor will go to deceleration.

Incidentally, a driver 6 which amplifies the signals for excitation pattern accessed from P-ROM and gives said amplified signals to the stepping motor 1, and a DC power source 7 serving as a supply source of said driver 6 are of the same type as that has heretofore commonly been known.

Figure 11:
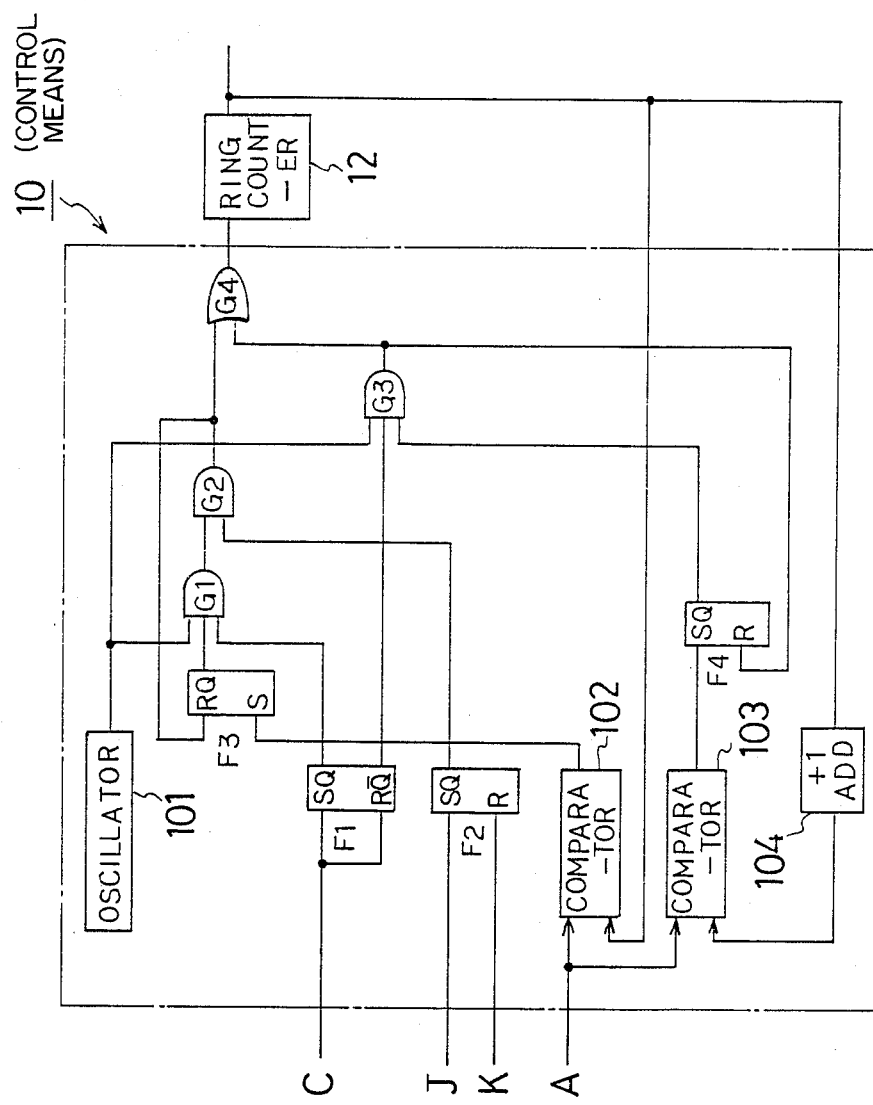
FIG. 11 is a circuit diagram showing a composition example of control means.

Referring then to FIG. 11, an actual circuit example of the control means 10 outlined above is illustrated therein. Although the control means 10 shown in this circuit example is essentially to give the count-up-clock signals emitted from the oscillator 101 to the ring counter 12 and to make them sequentially impress to an address decoder 13, when said control means 10 puts out such count-up-clock signals emitted from the oscillator 101, said control means carries out a logical analysis of the state where the stepping motor 1 stands just at that time by using the output signals emitted from the aforementioned encoder 2 and the signals processed through the phase discriminating means 4' or the wave form rectifying means 11, and at the same time carries out a control of the renovation speed of excitation pattern by controlling a conduction of the count-up-clock signals emitted from the oscillator 101 according to the said logical state.

A flip-flop circuit "F1" is to store the data to decide whether the stepping motor have to be accelerated or decelerated. That is to say, the output signals "C" of phase discriminating means 4' are put into a "SET" input port of the flip-flop "F1" and the "reverse" output signals of phase discriminating means 4' are put into a "RESET" input port of the said flip-flop "F1". Consequently, when the phase of output signals emitted from the encoder 2 is backward in position than that of reference clock signals "A", the flip-flop "F1" will be set and store the fact that the stepping motor have to be accelerated; and on the contrary when the phase of output signals emitted from the encoder 2 is forward in position than that of reference clock signals "A", the flip-flop "F1" will be reset and store the fact that the stepping motor have to be decelerated. Thus, when the flip-flop "F1" is set, the oscillator's clock pulse signals become possible to be put out through the AND gate "G1". Consequently the renovation speed of excitation pattern of the stepping motor will be quickened, thereby the stepping motor 1 will be brought to the acceleration mode.

Also, a flip-flop "F2" is to store the data to judge whether the stepping motor 1 is in normal run or reverse run by using the output signals of wave form rectifying means 11. That is to say, since the running motion of stepping motor, looking it microscopically, is generally made step by step, there is a possibility that certain of vibrations are caused by the repetition of normal/reverse rotations in the minutest hour especially in low speed zone. For this reason, when the stepping motor 1 is in normal run, if the signals for renovating the excitation pattern are given, it is feared that the stepping motor falls into disorder. Therefore, in this circuit example, it is designed to set the flip-flop "F2" with the use of normal rotation detecting signals "J" emitted from the wave form rectifying means 11 when the stepping motor is in normal rotation, and to reset the flip-flop "F2" with the use of reverse rotation detecting signals "K" emitted from the wave form rectifying means 11 when the stepping motor is in reverse rotation. Thus, the flip-flop "F2" functions to close an AND gate "G2" when the stepping motor is in reverse rotation to prevent an untimely renovation of the excitation pattern.

A flip-flop "F3" is to make a coordination of the excitation pattern given to the stepping motor 1 and the current phase of the stepping motor 1. As can be understood from the aforementioned descriptions, the stepping motor 1 runs one step every renovation of the excitation pattern, and also the encoder 2 puts out the pulse signals every time the stepping motor runs one step. However, there will be a certain time lag from said renovation of excitation pattern to said generation of the pulse signals. If the exciting operation is carried out for the next excitation pattern before the stepping motor runs actually to its fixed position after a certain excitation pattern has been excited, it is feared that the stepping motor runs into disorder. Therefore, this control device is contrived to interrupt the renovation of excitation pattern by resetting the flip-flop "F3" whenever the count-up-clock signals pass through the AND gate "G2" and closing the AND gate "G1", and then to set the flip-flop "F3" by the output signals of a comparator 102 and to open the AND gate "G1".

That is, the A-phase pulse signals (B-phase pulses are also warrantable) emitted from the encoder 2 are put into one of the input ports of the comparator 102, which counts up these pulse signals and detects an actual phase position of the stepping motor 1. The output signals of ring counter 12 fed into another input port of the comparator 102 indicate the excitation pattern of the stepping motor 1 to be excited just at that time. Then, the comparator 102 makes a comparison between the above-mentioned two signals and detects that the stepping motor 1 ran to a desired position and then derives the signals of "Logic 1" to its output terminal and sets the flip-flop "F3", thereby making the AND gate "G1" open and enables renovating further excitation pattern.

A flip-flop "F4" is employed in the renovation of excitation pattern at the time of deceleration. As noted above, when the phase of output signals emitted from the encoder 2 moves forward in position than that of the reference clock signals "A", the wave form of output signals "C" emitted from the phase discriminating means 4' begins to fall and the flip-flop "F1" is then reset and in consequence the AND gate "G1" is closed. The value counted up by the ring-counter 12 is accordingly not renovated, so that the excitation pattern also can not be renovated. As the result, the stepping motor 1 is led to a braked condition, i.e. decelerated, but the rotor keeps further on running for a little while due to its inertia force. Then, when a comparator 103 which is made in the same structure as that of comparator 102 detects that the rotor ran to the next excitation phase by comparing T-phase signals emitted from the encoder 2 with the value counted by the ring counter 12, the flip-flop "F4" will be set and the AND gate "G3" will then be opened.

Accordingly, the count-up-clock signals emitted from the oscillator 101 flow into the ring counter 12 through the AND gate "G3" and the OR gate "G4", and act to renovate the signals of ring counter 12 and further to make a coordination between the excitation pattern and the current phase of stepping motor 1. At this time, flip-flop "F4" is reset by the pulse signals passing through the AND gate "G3" and returns to original state. In this connection, an addition circuit 104 acts to add "1" to the value counted by the ring counter 12. That is to say, even if the stepping motor 1 ran one step due to the inertia force the excitation pattern itself will not yet be renovated, so that the present phase will move forward one step than the excitation phase to be excited. Thereupon, this control device is contrived to offset said progress of one step after making a comparison between the current phase and the excitation pattern by the aid of said addition circuit 104.

Having thus described the structure and working principle of the speed control device according to the present invention, its operational gist will next be described in further detail in connection with the aforementioned specification and the accompanying drawings.

Initially, when the operator operates to quicken an issue of reference clock signals to be emitted from the oscillator 5' in the case where starting or accelerating the stepping motor 1, the phase of said reference clock signals will naturally move forward in position than that of output signals emitted from the encoder 2. Accordingly, the continuous time of output signals "C" emitted from phase discriminating means 4', as aforementioned, at an initial stage will extremely be prolonged at the time of "Logic 1", while it will exceedingly be shortened at the time of "Logic 0", as shown in a timing chart of FIG. 4.

When the output signals "C" of phase discriminating means 4' is in "Logic 1", the flip-flop circuit "F1" will be set, and the AND gates "G1" and "G2" will both be opened because the flip-flop circuits "F2" and "F3" have both been set. And the count-up-clock signals of the oscillator 101 act to renovate the signals of ring counter 12 through the AND gates G1, G2 and the OR gate G4. Accordingly the excitation pattern accessed from the P-ROM 14 will also be renovated and in consequence the stepping motor 1 will be led to acceleration. At this time, though the flip-flop "F3" is reset and the AND gate "G1" is closed by the pulse signals passing through the AND gate "G2", if the current phase of stepping motor 1 moves to follow up to the transition of excitation pattern, the flip-flop "F3" is directly set and the AND gate "G1" is opened by the output signals of comparator 102 by which said transition of the excitation pattern is detected.

Thus the renovation of excitation pattern will sequentially be repeated and in consequence the stepping motor 1 will be led to acceleration following to said renovation of the excitation pattern.

In this way, the continuous time of output signals "C" emitted from the phase discriminating means 4' will gradually be shortened at the time of "Logic 1", and at the time of "Logic 0" it will be prolonged gradually, and when the two reach the balanced condition the speed of stepping motor 1 will be stabilized.

In this process, if the stepping motor 1 should temporally go into reverse rotation due to vibration or other unforeseen causes, the flip-flop "F2" will be directly reset by the reverse rotation detecting signals "K" emitted from the wave form rectifying means 11 and the AND gate "G2" will be closed, thereby the renovation of the excitation pattern will instantly be ceased. After this, when the stepping motor 1 returns to normal rotation, the flip-flop "F2" will immediately be set by the normal rotation detecting signals "J" emitted from the wave form rectifying means 11 and thereafter the renovation of excitation pattern can be carried out as in an ordinary way.

On the other hand, when the operator operates to delay the issue of reference clock signals "A" emitted from the oscillator 5' in order to decelerate the speed of stepping motor 1, the phase of the output signals emitted from the encoder 2 will move forward in position than that of reference clock signals. Accordingly, the continuous time of output signals "C" emitted from the phase discriminating means 4', as shown in the timing chart of FIG. 5, at an initial stage will exceedingly be shortened at the time of "Logic 1", while it is extremely prolonged at the time of "Logic 0".

When the output signals emitted from the phase discriminating means 4' show a state of "Logic 0", the flip-flop "F1" is reset and the conduction of count-up-clock signals passing through the AND gate "G1" is shut off, so that the renovation of the value counted by the ring counter 12 is stopped and the renovation signals of excitation pattern accessed from the P-ROM are also ceased to issue. And when the comparator 103 detects that the current phase of stepping motor 1 progressed due to the inertia force, the flip-flop "F4" is directly set and the AND gate "G3" is opened, so that the count-up-clock signals emitted from the oscillator 101 are fed to the ring counter 12 through the AND gate "G3" and the excitation pattern is renovated. Then, the flip-flop "F4" is directly reset by the count-up-clock signals passed through the AND gate "G3". After this, whenever the comparator 103 detects that the current phase of stepping motor 1 progressed due to the inertia force, the count-up-clock signals are put out through the AND gate "G3" to renovate the excitation pattern.

Therefore, when the output signals "C" of phase discriminating means 4' show a state of "Logic 0", the current phase of stepping motor 1 does not follow to the transition of excitation pattern in such a way that the output signals of phase discriminating means 4' functioned at the time of "Logic 1" but the excitation pattern itself is renovated by following to the transition of current phase which is caused by the inertia force of rotor. In this way, the stepping motor 1 will gradually led to deceleration, and when both continuous times of "Logic 0" and "Logic 1" which are respectively shown by the output signals "C" of phase discriminating means 4' come to a balanced condition, the running speed of stepping motor 1 will be stabilized.

GENERAL EFFECT OF THE INVENTION

As has been understood from aforementioned specification, the speed control device according to the present invention enabled controlling freely the running speed of the stepping motor driven in the closed loop by optionally changing the oscillation frequency of the oscillator which is one of the most important mechanisms of this speed control device, and also enabled preventing the stepping motor from any disorder or wrong motions which might be caused by unforeseen factors.

In aforementioned embodiment, having specifically explained the mechanism, working principle and operation for controlling a typical 4-phase stepping motor, it is needless to say that the speed control device under the present invention is not confined merely for this type. Also, in aforementioned embodiment, it has been explained with the use of an absolute encoder which is likewise one of the most important mechanisms of this speed control device, however, there is no doubt that in actual cases it is possible to use an incremental encoder or the like for this purpose by making a few changes in the existing circuit construction without doing a fundamental modification. Furthermore, in aforementioned embodiment, having specifically explained such aspects that the operator controls manually the frequency of oscillator, it goes without saying that said frequency control can be carried out according to a present program.

What is claimed is:

1. In a system for controlling the running speed of a stepping motor, including a stepping motor encoder for providing pulse signals representative of the stepping motor position and excitation phase, a distributor, and a speed control device connected to receive the pulse signals from the encoder and delivering a pulse train to said distributor, said speed control device comprising:
    pulse generator means for providing a series of pulses at a selectively variable repetitive frequency;
    phase detector means connected to receive the pulse signals from said encoder as a first input signal and the series of pulses from said pulse generator means at a second input signal, said phase detector means including means for detecting each phase of said first and second input signals; and
    means for shifting a motor excitation phase corresponding to an excitation phase indicated by the encoder pulse signals and thereby accelerating or decelerating the running speed of said stepping motor in accordance with a difference between logic levels "H" and "L" of output signals emitted from said phase detector.

2. In a system to control the running speed of a stepping motor through a contrivance designed to be possible to decide which excitation phase to be excited according to the output signals emitted from an encoder connected to said stepping motor; the speed control device for stepping motor comprising of,
    a clock signal generating means which generates a speed-variable reference clock signals,
    a phase discriminating means which makes a comparison between both phases of said reference clock signals and said output signals emitted from said encoder and gives an acceleration order if the phase of said reference clock signals leads the encoder output signals and gives a deceleration order if it lags the encoder output signals,
    a rotational direction detecting means to detect the rotational direction of stepping motor through said encoder output signals,
    a phase detecting means to detect the current phase of the said stepping motor through said encoder output signals,
    an acceleration means to make the excitation phase, subsequent to the present phase, step forward in turn when the acceleration order is given after detection by said rotational direction detecting means that said stepping motor is rotating normally, and
    a deceleration means to maintain the present excitation phase as it is whenever a deceleration order is given.

3. In a system to control the running speed of a stepping motor through a contrivance designed to make it possible to decide which excitation phase is to be excited according to the output signals emitted from an encoder connected to said stepping motor; the speed control device for stepping motor comprising of,
    a generating means of excitation pattern to be given to the said stepping motor,
    a renovation means to sequentially renovate said excitation pattern,
    a comparison means to compare an actual running speed of said stepping motor with an instructed speed,
    a control means for changing the running speed to renovate said excitation pattern according to a difference between said actual running speed of the stepping motor and said instructed speed.

* * * * *